United States Patent [19]
Morris

[11] Patent Number: 4,586,845
[45] Date of Patent: May 6, 1986

[54] MEANS FOR USE IN CONNECTING A DRIVE COUPLING TO A NON-SPLINED END OF A PUMP DRIVE MEMBER

[75] Inventor: Norman Morris, Buckingham, England

[73] Assignee: Leslie Hartridge Limited, Buckinghamshire, England

[21] Appl. No.: 696,577

[22] Filed: Jan. 29, 1985

[30] Foreign Application Priority Data

Feb. 7, 1984 [GB] United Kingdom ............... 8403133

[51] Int. Cl.⁴ ........................... B25G 3/28; F16B 2/00
[52] U.S. Cl. .................................. 403/354; 403/383
[58] Field of Search ............... 403/365, 383, 287, 366, 403/354

[56] References Cited
U.S. PATENT DOCUMENTS 1,332,898  3/1920  Hossie et al. ............... 403/354 X
1,781,032  11/1930 Redfield ..................... 403/337 X
2,191,304  2/1940  Ashendorf .................. 403/365 X
3,343,612  9/1967  Flowers ..................... 403/337 X

FOREIGN PATENT DOCUMENTS 118179  2/1944  Australia ..................... 403/354
36921   4/1971  Japan ......................... 403/383

Primary Examiner—Andrew V. Kundrat
Attorney, Agent, or Firm—Berman, Aisenberg & Platt

[57] ABSTRACT

An adaptor for use in connecting a drive coupling to a non-splined end of a pump shaft. The adaptor has means at one end thereof for connecting the adaptor to the end of the pump shaft, at least one flat by which the drive coupling can be made rotationally fast with the adaptor, and an opposite end of circular cross-section for location in a hole or recess of corresponding circular cross-section in the drive coupling to align an axis of the coupling with that of the pump shaft.

5 Claims, 7 Drawing Figures

MEANS FOR USE IN CONNECTING A DRIVE COUPLING TO A NON-SPLINED END OF A PUMP DRIVE MEMBER

The present invention relates to means for use in connecting a drive coupling to a non-splined end of a pump shaft or other pump drive member, for example means for use in connecting an electric drive motor or other prime mover to a tang-ended or spigot-ended shaft of a fuel or test oil pump arranged in fuel injection test equipment, via an anti-backlash coupling.

In our co-pending patent application Ser. No. 06/628,956 filed on July 6, 1984, we describe a connection between a spline ended pump shaft and a drive coupling. Hitherto, the same coupling has been used on a tang-ended or a spigot-ended pump shaft using an adaptor which has a splined periphery and a central slot or hole for engagement with the tang or spigot.

One disadvantage of such an adaptor is its complex shape and the resulting cost of manufacture.

One aim of the present invention is to provide an adaptor which is less complex or less costly to manufacture.

Accordingly, one aspect of the present invention is directed to an adaptor for use in connecting a drive coupling to a non-splined end of a pump shaft or other pump drive member, the adaptor having means at one end thereof for connecting the adaptor to the end of the pump drive member, at least one flat or other means by which the drive coupling may be made rotationally fast with the adaptor, and an opposite end of circular cross-section for location in a hole or recess of corresponding circular cross-section in the drive coupling to align an axis of the coupling with that of the pump drive member.

A further disadvantage of the previously proposed splined adaptor for a tang-ended pump shaft is that it is difficult to manufacture a central slot within the required tolerances to ensure alignment of an axis of the coupling with the axis of the pump shaft.

This problem may be overcome by an example of an adaptor made in accordance with the present invention, in which the said one end thereof is bifurcated.

The simplest and most desirable form for the bifurcated end is one which provides mutually inwardly facing flats one on each part of the bifurcation, which engage opposite sides of the tang, and outwardly facing flats, one on each part of the bifurcation, to engage mutually facing flats of an elongate hole or recess in a part of the drive coupling.

In one form of an adaptor in accordance with the present invention, the said one end thereof has a recess or hole of circular cross-section for receiving a spigot end of a pump shaft, and means for fixing that end of the adaptor to a flange around the end of the pump shaft.

The invention also extends to a component of the drive coupling for effecting connection between the adaptor and the rest of the coupling, having a slot, hole or recess with at least one face which engages a flat on the adaptor, and a circularly cross-sectioned hole or recess behind the slot, hole or recess for receiving the circularly cross-sectioned end of the adaptor.

In the event that the drive coupling is designed as an anti-backlash coupling, the effectiveness of the anti-backlash features is marred if the previously proposed splined adaptor is used on a tang-ended pump shaft, because such an adaptor itself introduces a backlash effect, and it is difficult to modify such an adaptor to overcome this problem. This problem is much more easily overcome by means of an adaptor made in accordance with an example of the present invention with a bifurcated end, in which to effect an anti-backlash coupling between the adaptor and the tang, locking means are provided to ensure a secure connection between the two. The locking means may be in the form of a wedge or wedges thrust between the bifurcated end of the adaptor and the tang, or more preferably locking screws in the adaptor.

Examples of an adaptor and a connecting component each made in accordance with the present invention are illustrated in the accompanying diagrammatic drawings, in which.

Figure 1:
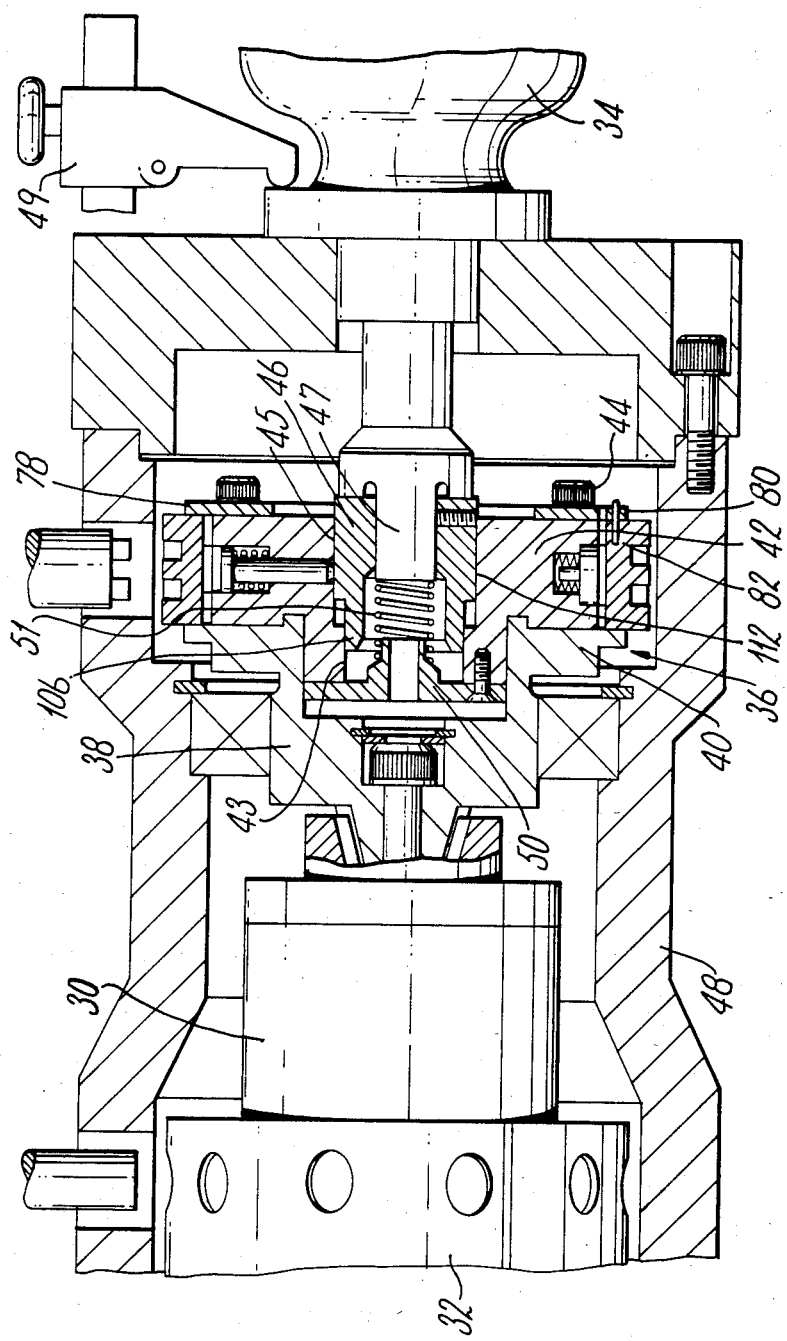
FIG. 1 is an axial sectional view of a drive connecting assembly which incorporates such an adaptor and such a component.

In FIG. 1, the output side 30 of an anti-backlash coupling 32 is connected to a pump 34 via an anti-backlash drive 36. The latter comprises an attachment cup 38 secured to the output side 30 of the coupling 32 and is provided with a flange 40 to which the anti-backlash drive component 42 is fixed by bolts 44. The anti-backlash drive component 42 is in the form of a ring or annulus which has an elongate hole or slot 45 for engagement with an adaptor 46 attached to a tang 47 at the end of the shaft of a pump 34. The component 42 also has a central circularly cross-sectioned hole or recess 43 behind the elongate hole or slot 45. Also shown in FIG. 1 are a drive housing 48 and a clamp 49 which holds the pump 34 against axial displacement from the drive 42.

A location plate 50 provides a seating for one end of a compression spring 51. The spring 51 extends through the adaptor, which is hollow for this purpose, and its other end applies a force to the tang 47 to urge the pump shaft inwardly in relation to the pump to keep the correct relative positioning of the shaft in the pump.

Figure 2:
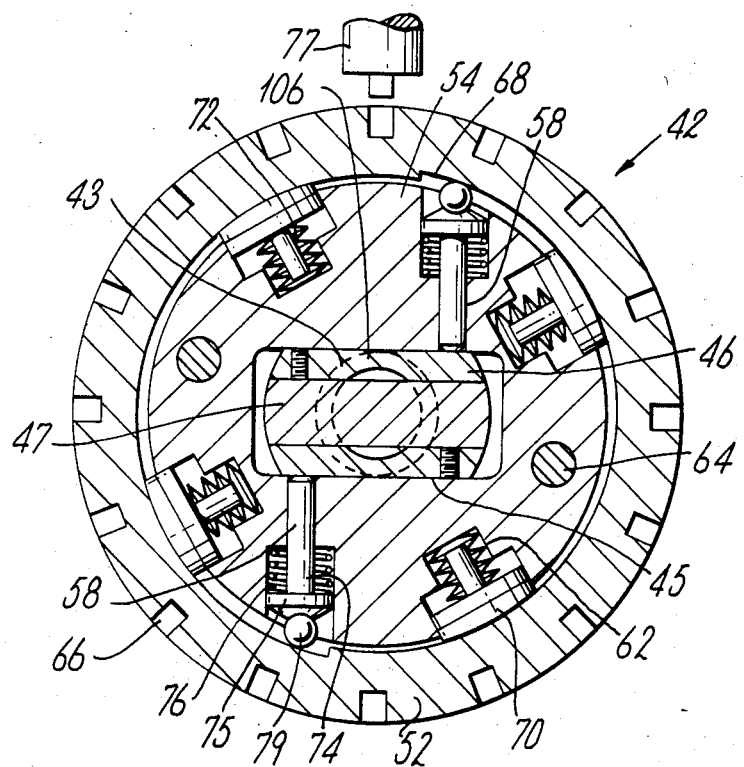
FIG. 2 is a cross-sectional view of the connecting component.

FIG. 2 shows details of the drive component 42. It comprises outer and inner concentric rings 52 and 54. The inner ring 54 is formed with the slot 45 at its centre, and two oppositely extending bores 58 which are parallel with but spaced to opposite sides of a diameter of the inner ring 54 which extends perpendicularly to the slot 45. The inner ring is further formed with four deep cylindrically-shaped recesses 62 extending inwardly from the outer periphery of the inner ring 54, and axially extending fixing bores 64. The outer ring 52 is formed around its outer periphery with pairs of recesses 66 (only one of each pair being evident from FIG. 2) and gently sloping ramp or cam faces 68 on its inside periphery. There are two such faces 68 on opposite sides of the outer ring 52 corresponding generally in position with the radially extending bores 58 in the ring 54.

Friction pads 70 are accommodated by the deep recesses 62 and are urged outwardly against the inside periphery of the outer ring 52 by compression springs 72. Respective fixing pins 74 extend through the axially extending bores 58 of the inner ring 54. The inner ends of these fixing pins engage the adaptor 46 on the tang 47. Towards their outer ends, the pins 74 are provided with flange portions 75 which are urged outwardly by compression springs 76. If the outer ring 52 is rotated in an anti-clockwise sense in relation to the inner ring 54, as viewed in FIG. 2, by means of a tool 77 engaging the pairs of recesses 66, the ramps or cam surfaces 68 act on cam rollers 79 between the surfaces 68 and the outer faces of the fixing pins 74 to drive the latter inwardly and force the inner ends of the fixing pins 74 against the adaptor 46. This prevents backlash between the component 42 and the adaptor 46. A keeper plate 78 (shown in FIG. 1) with slots 80 may be provided on the ring 54 so that its slots engage lugs 82 on the outer ring 52 to prevent over-rotation of the outer ring 52. The friction pads 70 prevent any relative slipping between the inner and outer rings 52 and 54 which would slacken the fixing action of the fixing pins.

Numerous variations and modifications to the component 42 will readily occur to the reader familiar with the art of drive connections without taking it outside the scope of the present invention. For example, the component 42 may be one which is driven rather than one which drives.

Figure 3:
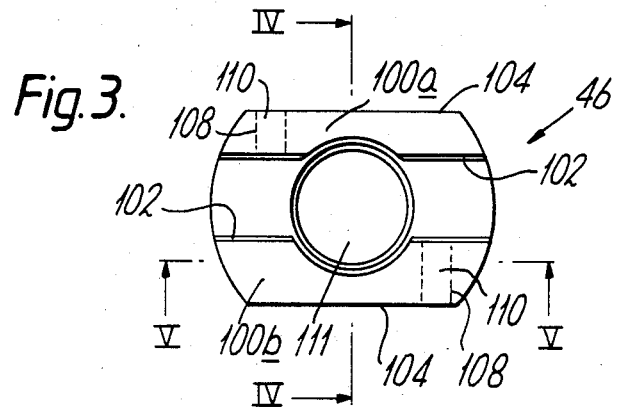
FIG. 3 is an end view of the adaptor.
Figure 4:
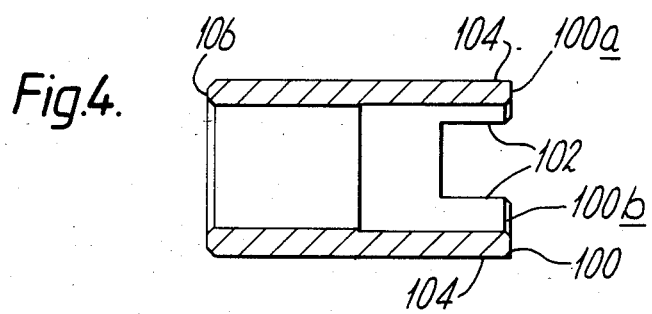
FIG. 4 is a section of the adaptor shown in FIG. 3 along the line IV—IV.
Figure 5:
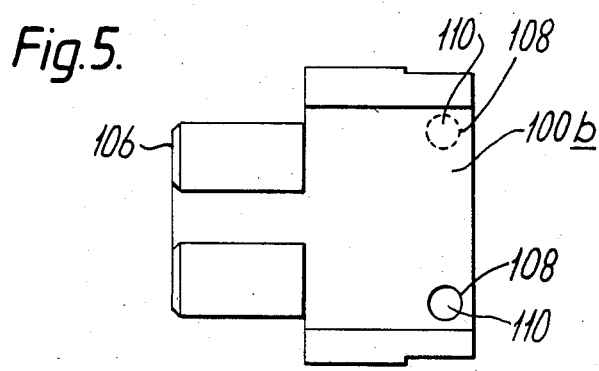
FIG. 5 is a diagrammatic, partly cross-sectional view of the adaptor shown in FIG. 3 along the line V—V.

The adaptor 46 is shown in greater detail in FIGS. 3 to 5. It comprises a bifurcated end 100 the two parts 100a and 100b of the bifurcation of which are each elongate in a lateral direction relative to the adaptor and each have an inwardly directed flat face 102 and an outwardly directed flat face 104. The other end 106 of the adaptor is of circular cross-section. Each part of the bifurcation has a laterally extending screw-threaded hole 108 through it, for receiving locking screws 110. The holes are parallel with one another but are off-centre to opposite sides of a central line which bisects the two parts of the bifurcation and extends perpendicularly thereto. When the adaptor 46 is on a tang 47 and in a coupling as shown in FIG. 1, it therefore fixes the adaptor relative to the tang in such a manner as to prevent backlash. Furthermore, the circularly cross-sectioned end 106 of the adaptor 46 is received by the circularly cross-sectioned hole or recess 43 in the drive component 42 to ensure that the proper axes of rotation of the adaptor 46 and the drive component 42 coincide.

A hole or recess 111 of circular cross-section is provided in the tang receiving end of the adaptor. This receives a narrowed portion of the tang which has a cross-section with arcuate sides the radius of curvature of which matches that of the hole or recess 111 so that the narrowed tang end fits therein and centres the axis of the adaptor with that of the pump shaft. The gap between the bifurcations is off-centre in relation to the centre of the hole or recess 111. This asymmetry prevents a 180 degree error in the relative positioning between the adaptor and the tang.

Figure 6:
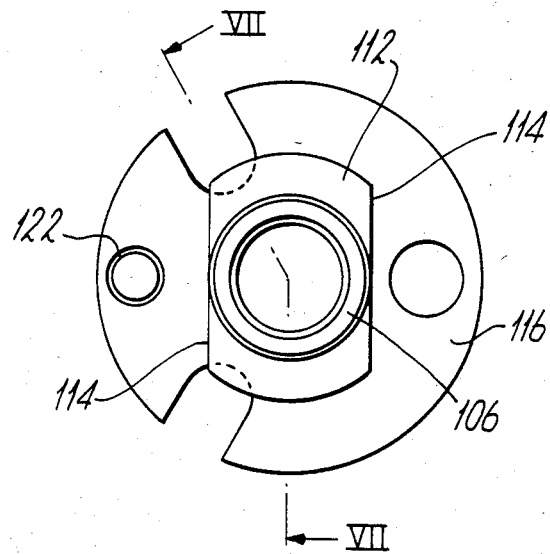
FIG. 6 is an end view of a modified form of adaptor.
Figure 7:
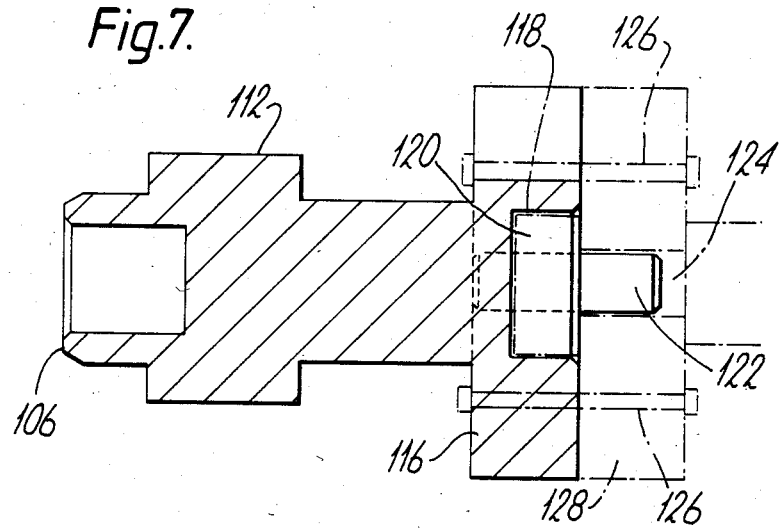
FIG. 7 is an axial sectional view of the adaptor shown in FIG. 6 taken along the line VII—VII.

The modified adaptor shown in FIGS. 6 and 7 is for connection to a spigot-ended pump shaft. It also has an end 106 of circular cross-section. Adjacent to that end is a widened portioned 112 on opposite sides of which are provided flats 114 corresponding to the outwardly facing flats 104 of the FIG. 3 adaptor. Thus the drive component 42 shown in FIGS. 1 and 2 is secured to the adaptor against relative rotational movement by means of the flats 114. Instead of being bifurcated, the other end of this modified form of adaptor has a flange 116, a central recess 118 of circular cross-section for receiving a circularly cross-sectioned spigot end of a pump shaft 120 (shown in dotted lines in FIG. 7) and an off-centre spigot 122 which engages a key 124 in the shaft end to give a precise relative rotational position between shaft and adaptor. The adaptor is fixed to the shaft by bolts 126 through the flange 116 of the adaptor and a flange 128 of the pump shaft end.

It will be noted that each of the two illustrated forms of adaptor has a circular hole or recess (111 in FIG. 3 or 118 in FIG. 7) in its tang receiving end which performs a centring function between the adaptor and shaft axes.

I claim:

1. For use in a connection between a drive coupling and a tang end of a pump drive member, an adaptor comprising:
   (a) a bifurcation at one end of said adaptor to enable said adaptor to engage a tang end of such a drive member;
   (b) mutually inwardly facing flats one on each part of said bifurcation, for engagement with opposite sides of such a tang end; and
   (c) outwardly facing flats, one on each part of said bifurcation, to engage mutually facing flats of an elongate hole or recess in a part of such a coupling; and
   (d) a circularly cross-sectioned opposite end of said adaptor to enable that end to be located in a hole or recess of corresponding circular cross-section in such a coupling whereby an axis of the coupling is aligned with that of the pump drive member.

2. An adaptor according to claim 1, wherein to effect an anti-backlash coupling between the adaptor and such a tang, locking means are provided to ensure a secure connection between the two.

3. A adaptor according to claim 2, wherein said locking means are in the form of locking screws in the adaptor.

4. An adaptor according to claim 1, wherein said one end thereof has a hole of circular cross-section for receiving a spigot end of a pump shaft.

5. An adaptor according to claim 1, wherein said one end thereof has means for fixing that end of the adaptor to a flange at the end of the pump shaft.

* * * * *